Oct. 29, 1957 A. V. LOUGHREN 2,811,579

COLOR-TELEVISION ELECTRO-OPTICAL APPARATUS

Filed Jan. 29, 1951 3 Sheets-Sheet 1

INVENTOR.
ARTHUR V. LOUGHREN

BY Lawrence B. Dodds

ATTORNEY

Oct. 29, 1957 A. V. LOUGHREN 2,811,579

COLOR-TELEVISION ELECTRO-OPTICAL APPARATUS

Filed Jan. 29, 1951 3 Sheets-Sheet 2

*INVENTOR.*
ARTHUR V. LOUGHREN

*BY* Lawrence B. Dodds

ATTORNEY

INVENTOR.
ARTHUR V. LOUGHREN
BY Laurence B. Dodds
ATTORNEY

United States Patent Office 2,811,579

Patented Oct. 29, 1957

2,811,579

COLOR-TELEVISION ELECTRO-OPTICAL APPARATUS

Arthur V. Loughren, Great Neck, N. Y., assignor to Hazeltine Research, Inc., Chicago, Ill., a corporation of Illinois Application January 29, 1951, Serial No. 208,335

6 Claims. (Cl. 178—5.4)

GENERAL

Figure 1:
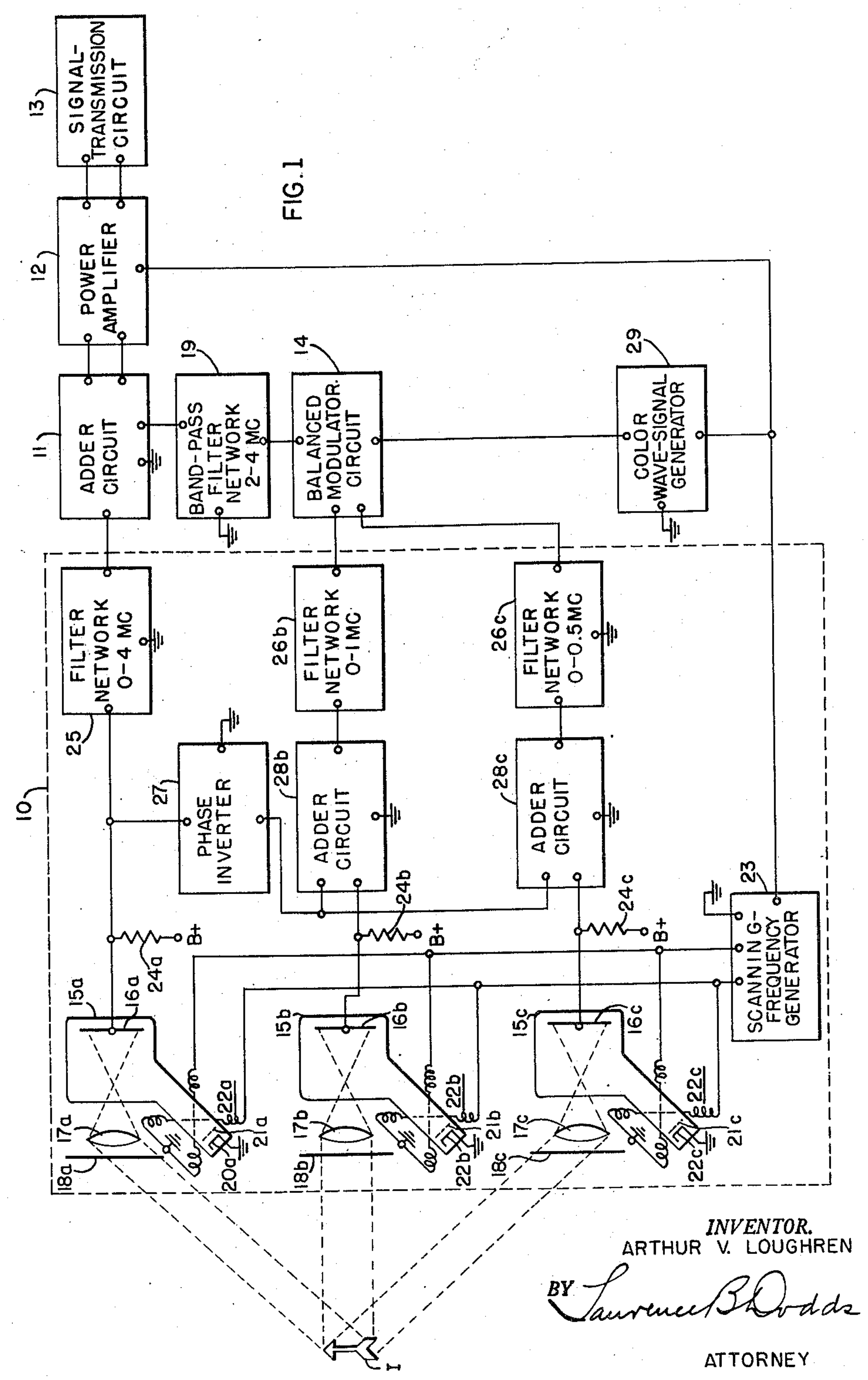

The present invention relates, in general to electro-optical apparatus in color-television systems which include transmitters and receivers for televising a color image. More particularly, the present invention relates to such apparatus in which light energy representative of the brightness and color characteristics of an image is converted at the transmitter into electrical signal energy and in which the signal energy is reconverted into light energy at the receiver.

It is known to translate information representative of a color image in terms of signal components related to the primary colors and the brightness thereof. These signals are conventionally developed by having individual electron beams scan one or more image screens on which effects related to the brightness characteristic and different primary color characteristics of the image are developed. If only one image screen is employed, the development of the effects thereon and the scanning thereof by the different beams are arranged to have some predetermined relation. The developed signals are individually representative of the primary colors of the image and collectively representative of the brightness thereof and are usually combined in some manner to develop a composite color signal which is translated for utilization by the receivers in the sytem.

In the more conventional systems utilizing a plurality of image screens, in the process of converting the energy representative of the primary colors into electrical energy and in the reconversion process from electrical energy to energy representative of the primary colors, there is a problem resulting from the need for a very precise predetermined spatial relation of the images on the respective image screens and for a precise scanning relation by the electron beams of the corresponding elemental areas of the images related to each of the primary colors. This predetermined relationship is commonly referred to as the registry of the related images and implies that the corresponding images are effectively superimposed. So far as is known, the systems of the prior art require this precise and accurate registry for each scanning line in the traced image raster so that a simultaneous accurate coalescence of the instantaneous individual impact points of a multiplicity of controlled electron beams is produced throughout the desired scanning raster.

In prior art arrangements it is found that even an accurately adjusted initial registry at the transmitter or the receiver is not usually sufficient to ensure that proper registration will be retained throughout the complete image raster representing each component color. The lack of assurance arises from the diverse deviations from deflection linearity that occur in scanning the component color images individually related to the primary colors. Circuit and power-supply variations may similarly effect accuracy of registration at times after initial registration has been established. In any event, in a system using what has formerly been considered in the prior art to have reasonable color definition, the permissible variations from strictly identical scanning within any individual raster could be no more than a minor fraction of the size of a scanning spot. Accordingly, the problem of high-definition image reproduction becomes quite difficult when many images are effectively superimposed and the prior art systems generally have sought to solve a problem of this type through the use of auxiliary control systems or networks capable of indicating any misregistry that might occur and correcting therefor.

The problem of registry occurs in a color-television system utilizing separate cathode-ray tubes for the different primary colors and an optical system to combine the images appearing on the image screens of the different tubes. Such registry necessitates optical adjustments so that the images are properly superimposed on the viewing screen. The problem is also encountered in a system using a single tube but employing a plurality of electron beams to scan rasters on a single image screen. In the latter system the beams conventionally travel along paths which originate at spacially separated points relative to the image or viewing screen. Single-tube equipment of this type conventionally has required the use of correcting circuits which modify or otherwise change the beam position by varying the deflection of the beam from time to time as the target is traced, when such variation is needed to effect registry.

As previously stated, the color-signal components to be translated, which individually represent the color characteristics of the image, and also the brightness components, which represent the brightness characteristics of the image, are conventionally derived from color signals developed in the different color cameras. In such arrangements, the color signals developed in the output circuit of the camera tubes usually are required to have definition characteristics equivalent to those desired for the brightness signals. Nevertheless, it is well known that the definition required for adequate color reproduction of an image is not as high as that required for a monochrome reproduction or for the reproduction of the brightness characteristic of an image. The human eye is insensitive to color definition higher than one-half the brightness definition to which the eye is sensitive. In view of this knowledge, it would appear that high-definition brightness components and low-definition color components should be translated through the system to be combined at a receiver in the system to reproduce a color image. The present invention is directed to apparatus which effects such a result thereby increasing the efficiency of the system and making it unnecessary to have precise registration between the components of the televised image relating to the brightness and color characteristics thereof.

It is an object of the present invention, therefore, to provide particularly for use in a color-television system new and improved electro-optical apparatus which avoids the above-mentioned limitation of prior art systems.

It is another object of the present invention to provide for use in a color-television system new and improved electro-optical apparatus which diminishes the need for preciseness of registry between different scanning rasters in such apparatus.

It is still another object of the present invention to provide new and improved electro-optical apparatus which separately develops and utilizes a high-definition brightness signal and low-definition color signals collectively representative of a televised image.

In accordance with the present invention, there is provided in a color-television system including a receiver for televising a color image developed from signal components related to the brightness and color characteristics thereof an electro-optical apparatus. The electro-optical apparatus comprises a first signal-translating channel effectively including a first transducer having a light valve as an image screen, having means for developing a beam and having means for causing the beam to scan the screen in a first raster and means for controlling the instantaneous light-translating characteristic of the valve. The first channel also includes means for deriving from the signal components a first signal group related to the brightness characteristic of the image and representative of the fine detail thereof and an impedance network having a predetermined pass band for translating the first signal group for application to the first transducer to modulate the beam in accordance with the brightness characteristic and fine detail of the image. The apparatus also includes at least a second signal-translating channel effectively including a second transducer having an image screen including a light-emitting phosphor coating, having means for developing a second beam and having means for causing the last-mentioned beam to scan the last-mentioned screen in a second raster to cause the second beam to activate the phosphor and develop instantaneous variations in the intensity of the light emitted by the phosphor. The second channel also includes means coupled to the second transducer for deriving from the signal components a second signal group related to the color characteristic of the image and a second impedance network having a pass band narrower than that of the first network for translating only those low-frequency components of the second signal group representative of the coarse color detail of the image for application to the second transducer to modulate the second-mentioned beam in accordance with the coarse detail of the color characteristic of the image. The apparatus also includes an electro-optical system for controlling the relative position and size of the rasters to cause the rasters to have such registry with each other that the extent of the deviation thereof from precise registry may be substantially greater than the minimum dimension of the fine detail in the image and is not substantially greater than the minimum dimension of the coarse color detail in the image, whereby the translated first group is effective to develop on the light valve an effect representative of a high-definition monochrome reproduction of the image and the translated second group is effective to add low-definition color to the effect representative of the high-definition monochrome reproduction so that the receiver reproduces the color image without requiring preciseness of registry of the first and second rasters.

In accordance with one embodiment of the invention, an electro-optical apparatus of a color-television receiver includes at least two and preferably three cathode-ray tubes on an image screen of each of which the image to be televised is optically focused. One of such cathode-ray tubes develops a signal representative of the brightness and fine detail of the image being televised, this signal being translated through a pass band of the order of 4 megacycles, and each of the other cathode-ray tubes develops a signal representative only of a color of the image having coarse detail, each of such color signals being translated through pass bands of the order of 1 megacycle or less. Because all of the fine detail is provided by one of the cathode-ray tubes and only coarse color detail by the other cathode-ray tubes, the optical system for focusing the images on the screens of the different cathode-ray tubes is of a simple, inexpensive type in which the adjustment of the registry of the rasters on the tubes for developing the coarse color signals, both with respect to each other and with respect to the raster on the tube for developing fine detail, is not critical. The magnitude of deviation of such adjustment from precise registry need be no smaller than the minimum dimension of the coarse color detail, that is, than the dimension along a line of scan represented by the period of a 1-megacycle signal.

For a better understanding of the present invention, together with other and further objects thereof, reference is had to the following description taken in connection with the accompanying drawings, and its scope will be pointed out in the appended claims.

Figure 2:
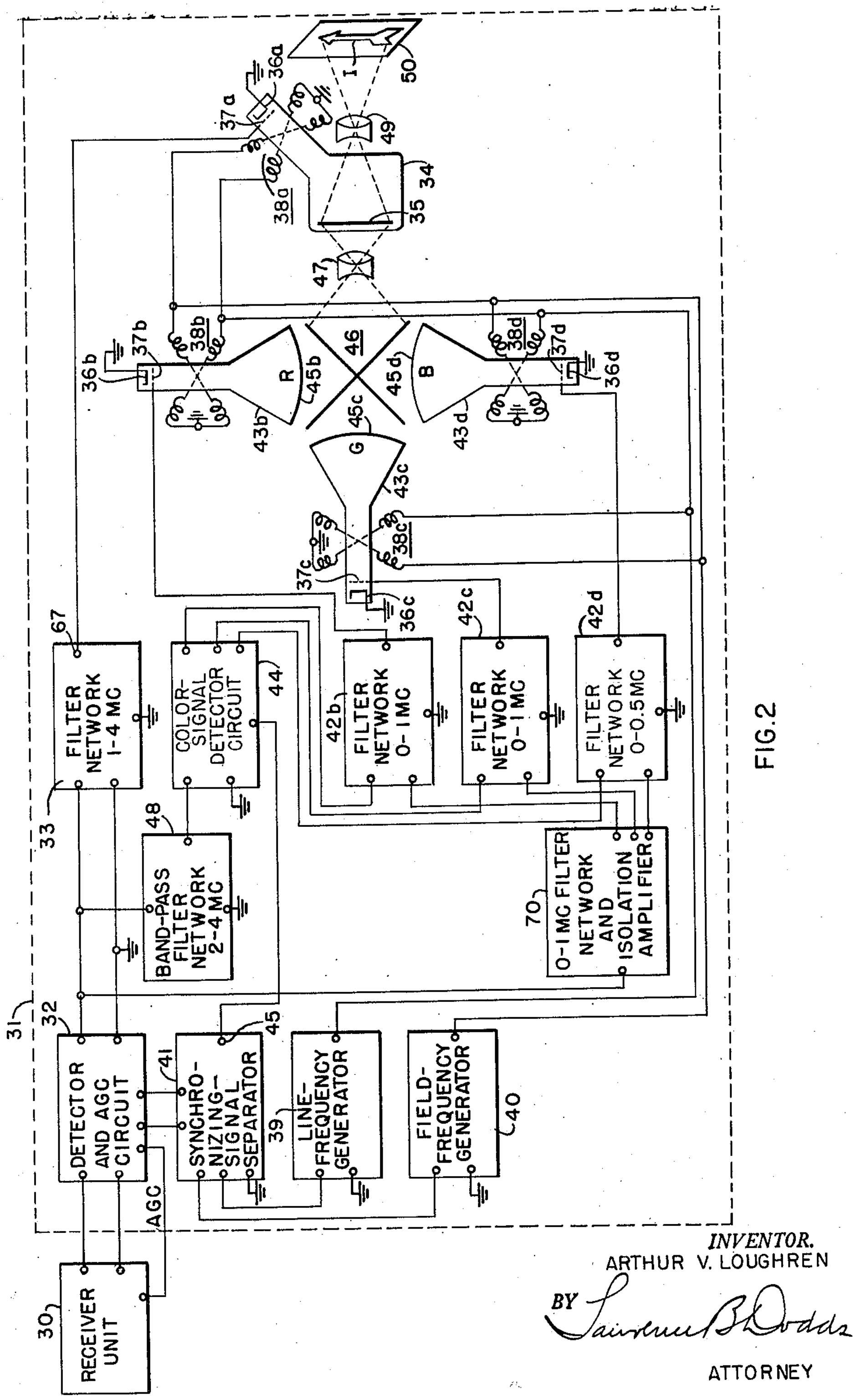
Figure 3:
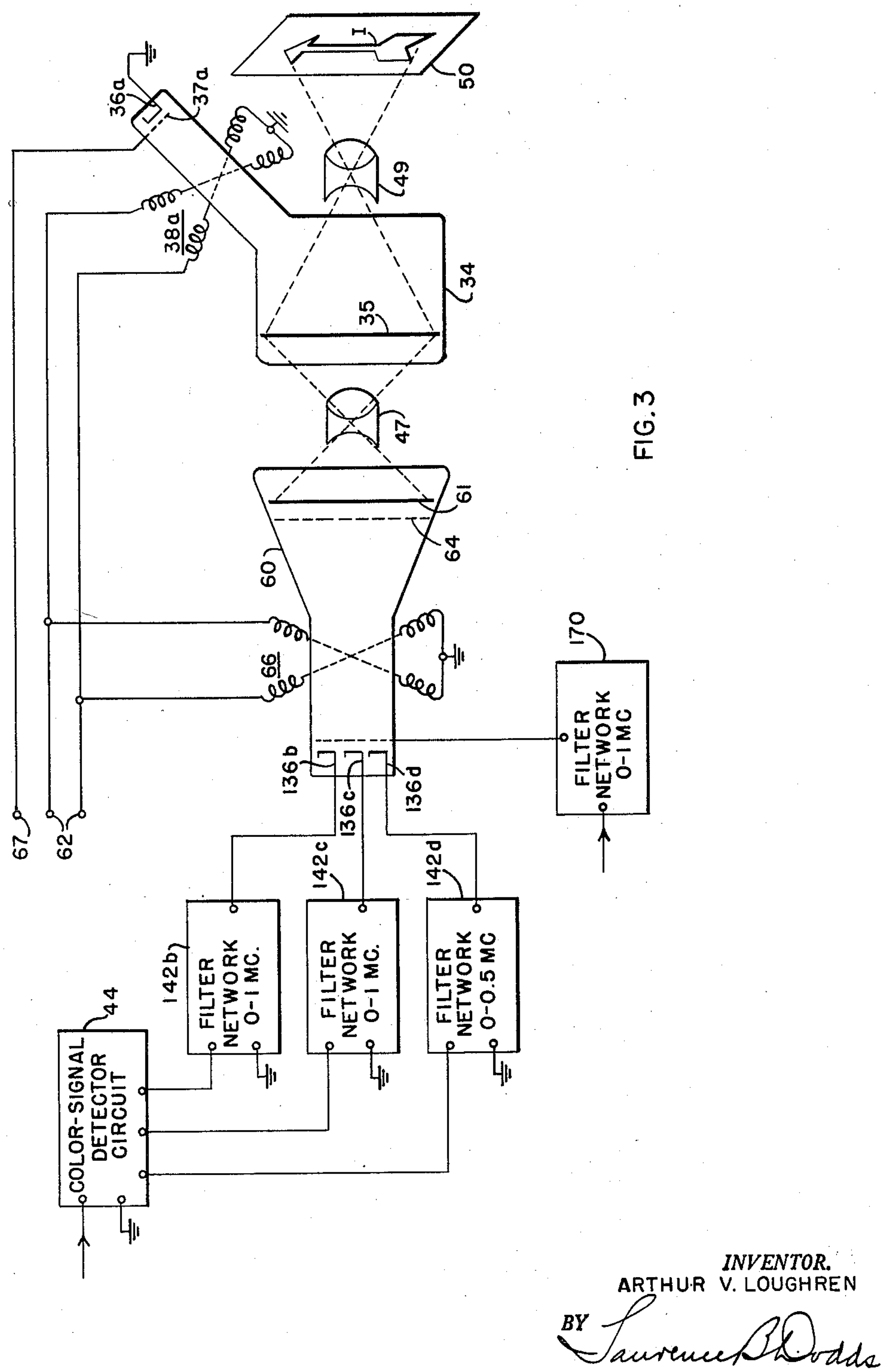

In the drawings, Fig. 1 is a schematic diagram of a transmitter including electro-optical apparatus; Fig. 2 is a schematic diagram of a receiver including an electro-optical apparatus embodying the present invention in one form; and Fig. 3 is a schematic diagram of a modification of the electro-optical apparatus of Fig. 2.

*General description of transmitter of Fig. 1*

Referring now more particularly to Fig. 1 of the drawings, there is represented a transmitter for producing and transmitting the type of television signals useful with apparatus in accordance with the present invention. The transmitter comprises an electro-optical apparatus 10 which will be described in more detail hereinafter but which generally includes means, specifically conventional cathode-ray camera tubes, for analyzing a color image I to develop signals representative of the brightness and color characteristics of the image I. Coupled thereto in cascade are an adder circuit 11 which comprises a signal-combining means and may, in a simple form, consist of a vacuum-tube circuit in which the signals to be combined are applied to different electrodes thereof, a power amplifier 12 and a signal-transmission circuit 13. The unit 13 may comprise means for applying the signals translated therethrough to a transmission line or may comprise means for radiating such signals.

The transmitter also includes a balanced modulator circuit 14 having input circuits coupled to those channels in the electro-optical apparatus 10 which are arranged to translate signals representative of the color characteristics of the image I and having an output circuit coupled through an approximately 2–4 megacycle band-pass filter network 19 to an input circuit of the adder circuit 11. The balanced or color-signal modulator circuit 14 also is coupled to a color wave-signal generator 29 and may comprise any of a number of well-known arrangements for combining signals representative of the primary colors of an image into a composite color signal. An arrangement for performing such function by effecting a time-sequential modulation of a subcarrier wave signal is more fully described in the United States Patent No. 2,146,862, granted to C. C. Shumard on February 14, 1939, entitled "Electronic Switching System," and is also more fully described in an article entitled "A six-megacycle compatible high-definition color television system" in the December 1949 issue of the RCA Review on pages 504–524, inclusive. The arrangements described in the above-mentioned patent and article are proportioned to effect modulation of the subcarrier wave signal at 0°, 120° and 240° phase points thereof. The unit 14 is proportioned to effect such modulation at 0° and 90° phase points and to develop a subcarrier wave signal including both upper and lower side bands. The generator 29 is proportioned to generate a wave signal having a frequency of approximately 3 megacycles. The network 19 is proportioned to have a bandwidth of approximately 2–4 megacycles.

A scanning-frequency generator 23 of a conventional type and which may include horizontal scanning and field-scanning generators, being a component of the unit 10, has an output circuit coupled to an input circuit of the amplifier 12 and also to the generator 29.

*General operation of transmitter of Fig. 1*

The general operation of the transmitter of Fig. 1 as thus far described will now be considered, and, for the moment, the detailed operation and description of the electro-optical apparatus 10 constructed in accordance with the present invention will be neglected. For brevity and clarity in such explanation, the operation of those components of the transmitter that are general to well-known types of color-television transmitters, all of the components represented schematically being such, will not be considered in detail. Briefly, images of the scene to be televised are focused separately on the screens of individual cathode-ray tubes and, through the use of conventional scanning thereof by separate electron beams, signal components representative of the brightness and the color characteristics of the scene are developed. Those signals representative of the brightness characteristic are applied to an input circuit of the adder circuit 11. Those signals representative of the color characteristics of the image are individually applied to input circuits of the color-signal modulator circuit 14, wherein they are combined as time-sequential modulation signals of a subcarrier wave signal. The signals developed in the modulator circuit 14 are then limited in bandwidth by the unit 19 to a selected bandwidth, preferably of approximately 2–4 megacycles, including the subcarrier wave signal with its side bands and applied to another input circuit of the adder circuit 11, wherein they combine with the signals representative of the brightness of the image to develop a composite video-frequency signal. The latter signal is then applied to the power amplifier 12 wherein it is combined with synchronizing signals developed in the unit 23 for the purpose of synchronizing selected circuits of a receiver with related circuits of the transmitter. The resultant signal is applied to the signal-transmission circuit 13 by means of which it is applied to a transmission line or radiated into the atmosphere.

*Description of electro-optical apparatus of Fig. 1*

Referring now more particularly to the electro-optical apparatus 10 of Fig. 1, this apparatus comprises a first signal-translating channel effectively including a first transducer having an image screen, having means for developing a beam and having means for causing the beam to scan the image screen in a first raster for developing potentials primarily representative of the brightness characteristic of a color image being televised. The first signal-translating channel comprises a transducer, specifically, a cathode-ray camera tube 15a including as an image screen a photosensitive target electrode 16a arranged to be the target screen for an optical path including a color filter 18a and a lens 17a for focusing a characteristic of the color image onto the screen 16a. The lens 17a and filter 18a comprise a means for developing on the screen 16a an image representative of the brightness characteristic of the color image.

The light filter 18a is proportioned to translate the brightness characteristic of the color image. Specifically, the spectral response of the light filter 18a in combination with the spectral response of the screen 16a is proportioned so that the effects developed on the screen 16a are defined as follows:

$$M=\frac{1}{3}R+\frac{2}{3}G \qquad (1)$$

where:

M represents the monochrome or brightness characteristic of the image, and

R and G, respectively, represent the red and green color characteristics of the image.

Effects related to the blue characteristic of the image are not included to define the brightness characteristic of the image since blue contributes such a small amount to brightness and the absence thereof simplifies the system utilized and introduces negligible errors. Nevertheless, if desired, in accordance with the teaching herein presented, a more elaborate system can be arranged to utilize effects related to the blue coloring of the image in combination with those related to the red and green to define the brightness characteristic thereof.

The cathode-ray tube 15a also includes an electron-gun structure having a cathode 20a and a control electrode 21a for developing and directing an electron beam onto the screen 16a in a conventional manner. Other elements of the gun structure and the energizing means therefor are not represented in Fig. 1 for simplification in description and explanation of the invention. Windings 22a provide a deflection circuit for the electron beam so that the beam scans the screen 16a in a first raster, these windings being coupled to the scanning-frequency generator 23.

The first signal-translating channel also includes means for deriving a first signal group related to said potentials primarily representative of the brightness characteristic and fine details of the aforementioned color image, specifically, a load impedance 24a connected between the screen 16a and a source of suitable potential +B. In addition, the first signal-translating channel includes an impedance network having a predetermined pass band, preferably filter network 25 having a pass band of approximately 0–4 megacycles, effectively coupled to the transducer 15a, specifically to the image screen thereof, for translating the first signal group derived on the resistor 24a. The output circuit of the filter network 25 is coupled to an input circuit of the adder circuit 11.

The electro-optical apparatus also comprises a second signal-translating channel effectively including a second transducer having an image screen, having means for developing a beam and having means for causing the beam to scan the last-mentioned screen in a second raster and develop effects representative of the coarse color detail of a color characteristic of the image. Specifically, the second transducer is a cathode-ray camera tube 15b similar to the tube 15a of the first portion described above, other components of the tube 15b corresponding to related components of the first portion being designated by the same reference numerals with the suffix "*b*" instead of the suffix "*a*." The color light filter 18b is proportioned so that its spectral response in combination with the spectral response of the screen 16b causes potentials related to at least the coarse details of the red color characteristics of the image to be developed on the screen 16b.

The apparatus also includes an electro-optical system for causing the rasters in the first and second transducers, more specifically, in the tubes 15a and 15b to have such registry with each other that the extent of the deviations thereof from precise registry is substantially greater than the minimum dimension of the fine detail in the image and is substantially equal to the minimum dimension of the coarse detail in the image. More specifically, such electro-optical system comprises the lenses 17a and 17b and the deflection windings 22a and 22b so positioned and controlled that corresponding elemental areas of the images on the screens 16a and 16b are simultaneously scanned by the electron beams in the tubes 15a and 15b. Such positioning and control are effected, for example, by the conventional means provided for positioning lenses and the deflection yokes of cathode-ray tubes. Due to the lack of the need for precise registry, only reasonably coarse adjustments are needed rather than the fine vernier adjustments usually required when precise registry is necessary.

The second signal-translating channel also includes means for deriving a second signal group related to the last-mentioned potentials and representative of the coarse color detail of the image and a second impedance network having a pass band narrower than that of the first network and means for coupling the second network to said last-mentioned deriving means for translating the second signal group. Specifically, there is provided a second load impedance or resistor 24b coupled in the output circuit of the tube 15b. The second impedance network is preferably a 0–1 megacycle filter network 26b having its input circuit coupled through an adder circuit 28b to an output circuit of the tube 15b including the resistor 24b. The output circuit of network 26b is coupled to an input circuit of the color-signal modulator 14. The unit 28b has an input circuit coupled through a phase inverter 27 to the output circuit of the tube 15a.

The second signal-translating channel may include a plurality of auxiliary signal-translating channels, one being provided for each color characteristic. Thus, the channel just described and including the tube 15*b*, the resistor 24*b*, the adder circuit 28*b* and the network 26*b* may be provided for the red color characteristic of the image and, for the blue color characteristic, there may be provided a cathode-ray tube 15*c* similar to the tubes 15*a* and 15*b* and other components similarly related to corresponding components of the above-described channel and designated by similar reference numerals with the suffix "*c*." The filter network 26*c* has a pass band of approximately 0–0.5 megacycle. The color light filter 18*c*, in conjunction with the screen 16*c*, is arranged to be responsive to the blue color characteristics of the image I and to develop effects on the screen 16*c*.

The units 11, 14 and 19, previously described, comprise means for combining the first and the second signal groups to develop a composite signal representative of the brightness and a color characteristic of the image.

*Explanation of operation of electro-optical apparatus of Fig. 1*

Referring now to the operation of the electro-optical apparatus 10, there are focused on the screens 16*a*, 16*b* and 16*c* images of the color image. The image focused on the screen 16*a* includes the brightness characteristics of the televised object as defined by Equation 1 above. The images focused on the screens 16*b* and 16*c* include, respectively, the red and blue color characteristics of the televised object. The beams developed in the different cathode-ray tubes are caused to scan substantially in register rasters on the respective image screens by means of the respective deflection windings as energized by the scanning-frequency generator 23 in a conventional manner. The images focused on the respective screens and the scanning thereof are caused to be in register by the synchronizing of the scanning beams, due to the common source of scanning energy in the generator 23 and by the physical adjustment of the lenses 17*a*, 17*b* and 17*c*, so that corresponding elemental areas of the images are scanned simultaneously.

As a result of the scanning operation, there are developed in the output circuits of the tubes 15*a*, 15*b* and 15*c*, specifically across the resistors 24*a*, 24*b* and 24*c*, signals related respectively to the brightness, red and blue color characteristics of the image. The signals related to the brightness characteristic retain their high-definition characteristic after being translated through the 0–4 megacycle filter network 25 and applied to the input circuit of the adder circuit 11. The low-definition signals related to the red and blue color characteristics individually have added thereto a phase-inverted brightness signal and are translated respectively through the 0–1 megacycle filter network 26*b* and the 0–0.5 megacycle filter network 26*c* to separate input circuits of the color-signal modulator circuit 14. The purpose of inserting the negative M component is to assure that when the M and each color component are added at the receiver to develop the color image, the pure colors will be developed. Thus, at a receiver $R-M+M=R$.

The signal developed across the resistor 24*a* is defined by Equation 1 above. The signal developed in the output circuit of the filter 26*b*, as has been mentioned, is related to the red color characteristic of the image and may be designated as R—M. Similarly, the signal in the output circuit of the unit 26*c* is related to the blue color characteristic of the image and may be designated as B—M.

It is seen that if the signal defined by Equation 1 above is combined with a portion of an inverted signal R—M, a signal related to the green color characteristic of the image, designated as G, is developed. Thus:

$$M-\tfrac{1}{2}(R-M)=\tfrac{1}{3}R+\tfrac{2}{3}G-\tfrac{1}{2}(R-\tfrac{1}{3}R-\tfrac{2}{3}G)=G \quad (2)$$

This is a process that ultimately occurs in a receiver but is described at this point to indicate how the information related to brightness and the green, red and blue color characteristics of the image is translated. For simplicity in obtaining the signal related to green, and to obtain other advantages, the modulator 14 is usually arranged, as previously described, to effect quadrature modulation of the signals related to red and blue so that a 180° phase reversal in the derivation at the receiver of the signal related to red will develop a signal related to green. This will be more evident when the receiver is described hereinafter. The reasons why the registry of the images at the transmitter or the receiver need not be precise will also be evident at that time.

As has previously been described, the modulated signal in the unit 14 is translated through the network 19 and combined with the brightness component in the unit 11. The composite signal is then amplified in the unit 12 and transmitted by means of the unit 13.

*Description of receiver of Fig. 2*

Referring now to the receiver of Fig. 2, this unit comprises a receiver unit 30 and an electro-optical apparatus 31 in accordance with the present invention. It will be understood that the unit 30 includes, in a conventional manner, one or more stages of wave-signal amplification, an oscillator-modulator and one or more stages of intermediate-frequency amplification if desired.

The electro-optical apparatus 31 of Fig. 2 is arranged to operate in a manner complementary to the apparatus 10 of Fig. 1. The first signal-translating channel of the apparatus 31 includes the detector 32, a 1–4 megacycle filter network 33 and a transducer or cathode-ray tube 34 coupled in cascade in the order mentioned. The detector 32 is a means for deriving a first signal group related to the brightness characteristic of the image. The filter network 33 is an impedance network having a predetermined pass band, for example one of about 1–4 megacycles, and is effectively coupled between the deriving means 32 and the control electrode 37*a* of the cathode-ray tube 34 for translating the first signal group thereto.

The cathode-ray tube 34 includes an image screen 35 and means for developing an electron beam to scan the screen 35 in a first raster and develop effects primarily representative of the brightness characteristic or the fine detail of the televised image. The latter means comprises an electron-gun structure including the cathode 36*a* and control electrode 37*a* for developing and controlling the intensity of a beam in a conventional manner. Deflection windings 38*a* are individually coupled to separate output circuits of a line-frequency generator 39 and a field-frequency generator 40, the latter generators each having input circuits coupled to separate output circuits of a synchronizing-signal separator 41. The unit 41 is also coupled to an output circuit of the detector 32.

The image screen 35 is a light valve that is normally transparent, including a coating of material such as alkali halide crystals, which, under the influence of a cathode-ray beam of varying intensity, varies in the degree of transparency at elemental points along a scanned raster. A cathode-ray tube utilizing such a screen for reproduction of an image is fully described in an article entitled "A system of large-screen television reception based on certain electron phenomena in crystals" by A. H. Rosenthal, in the May 1940 issue of the Proceedings of the I. R. E., at pages 203–212, inclusive.

The second signal-translating channel of the electro-optical apparatus 31 comprises, in cascade, a band-pass filter network 48 preferably having a pass band of approximately 2–4 megacycles, a color-signal detector circuit 44, a filter network 42*b* preferably having a pass band of approximately 0–1 megacycle, and a cathode-ray tube 43*b*. The input circuit of the unit 48 is coupled to the detector 32. The units 42*b* and 43*b* comprise a signal-translating channel for the signal representative of the red color characteristic of the image and a plurality of such channels each effective to translate a signal representative of a color characteristic of the image. Such channels are represented by the units 42*c* and 43*c* for the signals representative of green and by the units 42*d* and 43*d* for the signals representative of blue.

The color-signal detector circuit 44 comprises separate output circuits, individual ones of which are coupled to individual ones of the signal-translating channels. The networks 42*b* and 42*c* each have pass bands of approximately 0–1 megacycle while the network 42*d* has a pass band of approximately 0–0.5 megacycle. The cathode-ray tubes 43*b*, 43*c* and 43*d* each include electron-beam developing means and deflection windings similar to those associated with the tube 34 described above and corresponding ones thereof are therefore designated by similar reference numerals with the same suffix as that associated with the tube. The deflection windings are coupled to the line-frequency and field-frequency generators 39 and 40, respectively. The tubes 43*b*, 43*c* and 43*d* also include respective image screens 45*b*, 45*c* and 45*d* and are of the well-known phosphorescent type conventionally utilized for television image reproduction.

The color-signal detector circuit 44 is arranged to be complementary to the color-signal modulator circuit 14 of Fig. 1 for deriving the modulation signals developed in the unit 14. Therefore, a description of the basic circuits that might be employed in unit 44 will be found in the article and application referred to with reference to the unit 14. Generally, the detector circuit 44, since a quadrature type of time-sequential modulation of a subcarrier signal is employed to translate the color-signal information, will comprise a time-sequential detector for deriving individual signal components related to the different color signals. The detector 44 is arranged to derive the signals at phase relationships of 0° and 90°, respectively, for the signals related to the red and blue color characteristics. The detector also includes means for inverting the phase of the signal related to the red characteristic to develop the signal related to the green characteristic, as described with reference to the transmitter.

The electro-optical apparatus also includes a filter network and isolation amplifier 70, preferably having a pass band of approximately 0–1 megacycle, and having an input circuit coupled to the output circuit of the detector 32. The unit 70 includes a plurality of output circuits individually coupled to individual ones of the units 42*b*, 42*c* and 42*d*.

The tubes 43*b*, 43*c* and 43*d* are spacially located on three sides of a dichroic mirror system 46, the unobstructed side of which is focused by a lens 47 on the screen 35. The dichroic mirror system 46 is arranged to combine the images reproduced on the screens 45*b*, 45*c* and 45*d* and translate them, respectively, as the green, red and blue component images of the color image focused by the lens 47 on the screen 35. The images on the screens of the tubes 43*b*, 43*c* and 43*d* are arranged to be in approximate register by a physical positioning of the tubes and of the dichroic mirror 46 and by synchronous control of the scanning beams therein by means of the generators 39 and 40. The image presented on the screen of any one of the tubes 43*b*, 43*c* and 43*d*, or on the screens of all of these tubes, is arranged to be in register with the image developed on the screen 35 by a similar positioning of tubes and associated lenses and mirrors and synchronous control of scanning beams.

The screen 35 may be a screen arranged to be viewed directly by the observer, or a lens 49 may be included in the optical path of the observer and the screen 35 to focus the image on a viewing screen 50.

*Explanation of operation of receiver of Fig. 2*

Considering now the operation of the receiver of Fig. 2, televised signals are intercepted by the unit 30 and the video-frequency components thereof derived in the detector 32. Synchronizing-signal components are also derived in the detector 32 and utilized to control the line-frequency and field scanning of the image.

The first group of signals derived in the detector 32 having a bandwidth of 1–4 megacycles is translated through the network 33 and applied to the control electrode 37*a* of the tube 34 to control the intensity of the electron beam therein. The variation in intensity of the electron beam which scans the first raster on the transparent image screen 35 under the control of the deflection voltages developed in the windings 38*a* by the generators 39 and 40 produces a variation in the transparency of the screen 35 corresponding to a monochrome image of the fine detail of the televised image. Since 1–4 megacycle signals are applied to the control electrode 37*a*, the monochrome image effectively developed on the screen 35 is of a high-definition type and would be suitable for a monochrome reproduction of the high-definition portion of the televised image on the screen 50 if the dichroic mirror 46 was replaced by a source of light.

A subcarrier wave signal representative of the color characteristics of the televised image is applied through the unit 48 to the detector circuit 44 wherein different signal groups related to the different color characteristics of the image are derived effectively at 0°, 90° and 180° phase positions on the subcarrier wave signal. Individual ones of the color-signal groups together with 0–1 megacycle brightness components translated through the network 70 are translated through the networks 42*b*, 42*c* and 42*d* and applied to the control electrodes 37*b*, 37*c* and 37*d* of the cathode-ray tubes 43*b*, 43*c* and 43*d*. The electron beam in each of the last-mentioned tubes is intensity modulated by the signal applied to the control electrode thereof and develops on the screen of the tube an image related to a color characteristic of the televised image. Thus, an image related to the red color characteristic is developed on the screen 45*b*, an image related to the green color characteristic on the screen 45*c* and an image related to the blue color characteristic on the screen 45*d*. The dichroic mirror 46 causes a red image related to the image on the screen 45*b* to be reflected onto the screen 35, a blue image related to the image on the screen 45*d* also to be reflected on the screen 35 and translates a green image related to the image on the screen 45*c* onto the screen 35. The images on the screens 45*b*, 45*c* and 45*d* are of a coarse, low-definition type since comparatively low-frequency signal components are translated through the filters 70, 42*b*, 42*c* and 42*d* to develop such images.

The color images focused on the screen 35 from the dichroic mirror 46 provide the source of light for the screen 35 and the high-definition monochrome effects on the screen 35 combine with the low-definition color images to reproduce a high-definition color image which is focused by the lens 49 on the screen 50. Since the color images focused on the screen 35 appear as low-definition images on the screens 45*b*, 45*c* and 45*d*, they need not be precisely in register with each other. The degree of registry required is directly related to the definition of the images and therefore preciseness of registry is not necessary when low-definition images are being utilized. Similarly, since the image focused on the screen 35 by the lens 47 has low-definition characteristics, the registry between it and the high-definition monochrome effects on the screen 35 also need not be precise. The characteristic of the human eye which makes it insensitive to color definition higher than approximately one-half the brightness definition to which the eye is sensitive is a factor which permits such coarse registry. Thus, the invention provides an electro-optical apparatus in a color-television transmitter and/or receiver wherein high-fidelity color image reproduction at the receiver is obtainable without requiring preciseness of registry of the rasters scanned on the screens of the different tubes either at the transmitter or the receiver or both.

*Description and explanation of operation of electro-optical apparatus of Fig. 3*

Referring now to Fig. 3 of the drawings, there is represented another embodiment of the invention. Except for the fact that the cathode-ray tubes 43*b*, 43*c* and 43*d* of Fig. 2 have been replaced by a tube 60 having a single envelope but including multiple cathodes, the units of the apparatus of Fig. 3 are similar to those of the apparatus of Fig. 2. Therefore, similar components have been designated by similar reference numerals and analogous components by similar reference numerals with a factor of 100 added thereto.

The cathode-ray tube 60 is diagrammatically represented and only those portions have been illustrated which are necessary to an understanding of the application of the tube to the present invention. The tube comprises an image screen 61, an apertured mask 64, a control electrode and a plurality of cathodes 136*b*, 136*c* and 136*d*. A complete description of a tube of this type and of its employment as an image-reproducing device for color images is presented in an article entitled "General description of receivers for the dot-sequential color television system which employ direct-view tri-color kinescopes" in the June 1950 issue of the RCA Review on pages 228–232, inclusive. It is seen that the tube 60 effectively comprises a plurality of transducers, the combination of the image screen 61 with each of the cathodes of the tube comprising a transducer. The deflection windings 38*a* and 66 terminate in terminals 62, 62 which are arranged individually to be coupled to the output circuits of units such as the units 39 and 40 of Fig. 2. The cathodes are coupled to individual ones of the networks 142*b*, 142*c* and 142*d*. The filter network 170 is coupled to the control electrode of the tube 60.

The perforated mask 64 is located parallel to the plane of the screen 61 and between the screen 61 and the cathodes 136*b*, 136*c* and 136*d*. The screen 61 is composed of an orderly array of small, closely spaced, aluminized phosphor dots arranged as triangular groups, each group comprising a dot which emits green light, another which emits red light and a third dot which emits blue light.

Considering now the operation of the apparatus of Fig. 3, it will be seen that, except for the development of the color images on the screen 61, the operation thereof is similar to that described with relation to the apparatus of Fig. 2.

For a detailed operation of the cathode-ray tube 60, reference is made to the RCA Review article referred to above. In general, the color-signal components translated through the networks 142*b*, 142*c* and 142*d* are applied to the cathodes 136*b*, 136*c* and 136*d*, respectively. The 0–1 megacycle portion of the brightness component is applied to the control electrode of the tube 60 to combine therein with each of the color-signal components applied to the cathodes thereof to develop color signals representative of the green, red and blue color characteristics of the televised image. The cathodes 136*b*, 136*c* and 136*d* emit electron beams having intensities related to the signal amplitudes of the 0°, 90° and 180° phase points, respectively, of the subcarrier wave signal. Thus, the cathode 136*b* emits electrons having an intensity related to the amplitude of the subcarrier wave signal at 0°, the cathode 136*d* related to the amplitude at 90° and the cathode 136*c* related to the amplitude at 180°, each beam being modulated in intensity by signals related to one color characteristic of the image. The registration of the different beams in developing images related to the different color characteristics of the televised image is arranged by the proper alignment of the apertures in the mask 64 with their corresponding groups of color-emitting phosphor dots on the screen 61. The beams from the different cathodes, because of the spatial relationship of the cathodes to the apertures and the individual dots of a group, are each caused to impinge, at any one instant during the scanning operation, upon a phosphor dot on the screen 61 having a color-emitting characteristic related to the color characteristic of the signal controlling that beam. The mask 64 assures that the beam from only one of the cathodes can impinge upon any one dot in any group of three. In this manner a color image having low-definition characteristics is developed on the screen 61. This image then is focused by the lens 47 on the screen 35 so as to be coarsely in register with the raster scanned on the screen 35 in a manner similar to that in which the images passing through the dichroic mirror system 46 in the apparatus of Fig. 2 are focused on the screen 35.

In considering the above embodiments, it is to be understood that the principle of the invention has been described in the environment of a television system using a specific method for the translation of information relating to the color characteristics of an image. It should be obvious that many different methods may be employed for the translation of such information and this invention is not intended to be limited to the method of translation of the color signals as described herein. Specifically, parameters of the color image relating to the brightness and various color characteristics thereof have been employed in describing the invention. It will be understood by those skilled in the art that different parameters may be employed to translate the desired information without altering the teachings of the invention. It should be understood that the present invention is directed broadly to the principle that one parameter of the color image is to be developed and translated with high-definition characteristics while other parameters thereof may be translated with low-definition characteristics so that the assembly of the component images defined by the different parameters into a reproduction of the color image may be performed without the requirement of precise registry of the component images.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a color-television system including a receiver for televising a color image developed from a signal components related to the brightness and color characteristics thereof, an electro-optical apparatus comprising: a first signal-translating channel effectively including a first transducer having a light valve as an image screen, having means for developing a beam and having means for causing said beam to scan said screen in a first raster and means for controlling the instantaneous light-translating characteristic of said valve, means for deriving from said signal components a first signal group related to said brightness characteristic of said image and representative of the fine detail thereof, and an impedance network having a predetermined pass band for translating said first signal group for application to said first transducer to modulate said beam in accordance with said brightness characteristic and fine detail of said image; and at least a second signal-translating channel effectively including a second transducer having an image screen including a colored light-emitting phosphor coating, having means for developing a second beam and having means for causing said last-mentioned beam to scan said last-mentioned screen in a second raster to cause said second beam to activate said phosphor and develop instantaneous variations in the intensity of the light emitted by said phosphor, means coupled to said second transducer for deriving from said signal components a second signal group related to said color characteristic of said image, a second impedance network having a pass band narrower than that of said first network for translating only those low-frequency components of said second signal group representative of the coarse color detail of said image for application to said second transducer to modulate said second-mentioned beam in accordance with said coarse detail of said color characteristic of said image, and an electro-optical system for controlling the relative position and size of said rasters to cause said rasters to have such registry with each other that the extent of the deviation thereof from precise registry may be substantially greater than the minimum dimension of said fine detail in said image and is not substantially greater than the minimum dimension of said coarse color detail in said image, said image screens being so positioned that said colored light passes through said light valve, whereby said translated first group is effective to develop on said light valve an effect representative of a high-definition monochrome reproduction of said image and said translated second group is effective to add low-definition color to said effect representative of said high-definition monochrome reproduction so that said receiver reproduces said color image without requiring preciseness of registry of said first and said second rasters.

2. In a color-television system including a receiver for televising a color image developed from signal components related to the brightness and color characteristics thereof, an electro-optical apparatus comprising: a first signal-translating channel effectively including a first transducer having a light valve as an image screen, having means for developing a beam and having means for causing said beam to scan said screen in a first raster and means for controlling the instantaneous light-translating characteristic of said valve, means for deriving from said signal components a first signal group related to said brightness characteristic of said image and representative of the fine detail thereof, and an impedance network coupled between said deriving means and said first transducer and having a predetermined pass band for translating said first signal group for application to said first transducer to modulate said beam in accordance with said brightness characteristic and fine detail of said image; and at least a second signal-translating channel effectively including a second transducer having an image screen including a colored light-emitting phosphor coating, having means for developing a beam and having means for causing said last-mentioned beam to scan said last-mentioned screen in a second raster to cause said second beam to activate said phosphor and develop instantaneous variations in the intensity of the light emitted by said phosphor, means coupled to said second transducer for deriving from said signal components a second signal group related to said color characteristic of said image, a second impedance network coupled between said second-mentioned deriving means and said second transducer and having a pass band narrower than that of said first network for translating only those low-frequency components of said second signal group representative of the coarse color detail of said image for application to said second transducer to modulate said second beam in accordance with said coarse detail of said color characteristic of said image, and an electro-optical system for controlling the relative position and size of said rasters to cause said rasters to have such registry with each other that the extent of the deviation thereof from precise registry may be substantially greater than the minimum dimension of said fine detail in said image and is not substantially greater than the minimum dimension of said coarse color detail in said image, said image screens being so positioned that said colored light passes through said light valve, whereby said translated first group is effective to develop on said light valve an effect representative of a high-definition monochrome reproduction of said image and said translated second group is effective to add low-definition color to said effect representative of said high-definition monochrome reproduction so that said receiver reproduces said color image without requiring preciseness of registry of said first and said second rasters.

3. In a color-television system including a receiver for televising a color image developed from signal components related to the brightness and color characteristics thereof, an electro-optical apparatus comprising: a first signal-translating channel effectively including a first transducer having a light valve as an image screen, having means for developing a beam and having means for causing said beam to scan said screen in a first raster and means for controlling the instantaneous light-translating characteristic of said valve at incremental points along said raster, means for deriving from said signal components a first signal group related to said brightness characteristic of said image and representative of the fine detail thereof, and an impedance network having a predetermined pass band for translating said first signal group for application to said first transducer to modulate said beam in according with said brightness characteristic and fine detail of said image; and at least a second signal-translating channel effectively including a second transducer having an image screen including a phosphor coating effective to emit colored light, having means for developing a beam and having means for causing said last-mentioned beam to scan said last-mentioned screen in a second raster and develop colored light on said last-mentioned screen, means for deriving from said signal components a second signal group related to said color characteristic of said image, a second impedance network having a pass band narrower than that of said first network for translating only those low-frequency components of said second group signal representative of the coarse color detail of said image for application to said second transducer to modulate said second-mentioned beam in accordance with said coarse detail of said color characteristic of said image and to develop a low-definition color reproduction of said image on said last-mentioned image screen, and an electro-optical system for controlling the relative position and size of said rasters to cause said rasters to have such registry with each other that the extent of the deviation thereof from precise registry may be substantially greater than the minimum dimension of said fine detail in said image and is not substantially greater than the minimum dimension of said coarse color detail in said image, said image screens being so positioned that said colored light passes through said light valve, whereby said light valve causes the high-definition brightness characteristic of said image to be combined with said low-definition color reproduction so that said receiver reproduces said color image without requiring preciseness of registry of said first and said second rasters.

4. In a color-television system including a receiver for translating signal groups representative of the brightness and fine detail and coarse detail color characteristics of a color image, an electro-optical apparatus comprising: a first means responsive to said signal groups for deriving a first signal group related to said brightness characteristic and fine detail of said image; a second means responsive to said signal groups for deriving a second signal group related to a coarse detail color characteristic of said image; individual filter networks coupled to individual ones of said deriving means, said network coupled to said first means having a wide predetermined pass band for translating said first group and said network coupled to said second means having a pass band narrower than that of said predetermined pass band for translating said second group; individual cathode-ray-tube devices coupled to individual ones of said filter networks and including an electron-beam deflection circuit, and means for developing an electron beam and for modulating the intensity thereof by individual ones of said groups of signals, one of said devices also including a light valve as an image screen and another of said devices including an image screen having a phosphor coating effective to emit colored light; means coupled to said deflection circuits and arranged to develop control signals effective to cause each of said beams to scan each of said image screens in a raster; and an electro-optical system for controlling the relative positioning and sizes of said rasters to cause said rasters to have such registry with each other than the extent of the deviation thereof from precise registry may be substantially greater than the minimum dimension of said fine detail in said image and is not substantially greater than the minimum dimension of said coarse color detail in said image, said image screens being so positioned that said colored light passes through said light valve; said intensity modulation of said scanning beam in said one device being effective to control the transparency of said valve in a manner representative of said brightness characteristic and fine detail and said intensity modulation of said scanning beam of said other device being effective to modulate the phosphor of said phosphor coating to emit colored light representative of said coarse detail color characteristic, whereby colored light representative of a low-definition color reproduction of said image is emitted from said phosphor and said light valve causes the high-definition brightness characteristic of said image to be combined with said low-definition color reproduction to reproduce said color image without requiring preciseness of registry of said rasters.

5. In a color-television system including a receiver for translating signal groups representative of the brightness and fine detail and coarse detail color characteristics of a color image, an electro-optical apparatus comprising: a first means responsive to said signal groups for deriving a first signal group related to said brightness characteristic and fine detail of said image; a second means responsive to said signal groups for deriving a second signal group related to a coarse detail color characteristic of said image; individual filter networks coupled to individual ones of said deriving means, said network coupled to said first means having substantially a 1–4 megacycle pass band for translating said first group and said network coupled to said second means having substantially a 1 megacycle pass band for translating said second group; individual cathode-ray-tube devices coupled to individual ones of said filter networks and including an electron-beam deflection circuit, and means for developing an electron beam and for modulating the intensity thereof by individual ones of said groups of signals, one of said devices also including a light valve as an image screen and another of said devices including an image screen having a phosphor coating effective to emit colored light; means coupled to said deflection circuits and arranged to develop control signals effective to cause each of said beams to scan each of said image screens in a raster; and an electro-optical system for controlling the relative positioning and sizes of said rasters to cause said rasters to have such registry with each other that the extent of the deviation thereof from precise registry may be substantially greater than the minimum dimension of said fine detail in said image and is not substantially greater than the minimum dimension of said coarse color detail in said image, said image screens being so positioned that said colored light passes through said light valve; said intensity modulation of said scanning beam in said one device being effective to control the transparency of said valve in a manner representative of said brightness characteristic and fine detail and said intensity modulation of said scanning beam of said other device being effective to modulate the phosphor of said phosphor coating to emit colored light representative of said coarse detail color characteristic, whereby colored light representative of a low-definition color reproduction of said image is emitted from said phosphor and said light valve causes the high-definition brightness characteristic of said image to be combined with said low-definition color reproduction to reproduce said color image without requiring preciseness of registry of said rasters.

6. In a color-television system including a receiver for translating signal groups representative of the brightness and fine detail and coarse detail color characteristics of a color image, an electro-optical apparatus comprising: a first means responsive to said signal groups for deriving a first signal group related to said brightness characteristic and fine detail of said image; a second means responsive to said signal groups for deriving a second signal group related to a coarse detail color characteristic of said image; individual filter networks coupled to individual ones of said deriving means, said network coupled to said first means having substantially a 3 megacycle pass band for translating said first group and said network coupled to said second means having substantially a 1 megacycle pass band narrower than that of said predetermined pass band for translating said second group; individual cathode-ray-tube devices coupled to individual ones of said filter networks, each including an electron-beam deflection circuit and means for developing an electron beam and for modulating the intensity thereof by individual ones of said groups of signals, one of said devices also including a light valve as an image screen and another of said devices including an image screen having a phosphor coating effective to emit colored light; a scanning-signal generator coupled to said deflection circuits and arranged to develop control signals effective to cause each of said beams to scan each of said image screens in a raster; and an electro-optical system for controlling the relative positioning and sizes of said rasters to cause said rasters to have such registry with each other that the extent of the deviation thereof from precise registry may be substantially greater than the minimum dimension of said fine detail in said image and is not substantially greater than the minimum dimension of said coarse color detail in said image, said image screens being so positioned that said colored light passes through said light valve; said intensity modulation of said scanning beam in said one device being effective to control the transparency of said valve in a manner representative of said brightness characteristic and fine detail and said intensity modulation of said scanning beam of said other device being effective to modulate the phosphor of said phosphor coating to emit colored light representative of said coarse detail color characteristic, whereby colored light representative of a low-definition color reproduction of said image is emitted from said phosphor and said light valve causes the high-definition brightness characteristic of said image to be combined with said low-definition color reproduction to reproduce said color image without requiring preciseness of registry of said rasters.

References Cited in the file of this patent

UNITED STATES PATENTS

| | | |
|---|---|---|
| 2,330,172 | Rosenthal | Sept. 21, 1943 |
| 2,335,180 | Goldsmith | Nov. 23, 1943 |
| 2,375,966 | Valensi | May 15, 1945 |
| 2,423,769 | Goldsmith | July 8, 1947 |
| 2,492,926 | Valensi | Dec. 27, 1949 |
| 2,509,038 | Goldsmith | May 23, 1950 |
| 2,554,693 | Bedford | May 29, 1951 |
| 2,566,693 | Cherry | Sept. 4, 1951 |
| 2,635,140 | Dome | Apr. 14, 1953 |
| 2,641,643 | Wentworth | June 9, 1953 |
| 2,750,439 | Kell | June 12, 1956 |

OTHER REFERENCES

Mixed Highs in Color Television, Proceedings of the I. R. E., September 1950.